United States Patent [19]
Ratzlaff

[11] Patent Number: 5,099,889
[45] Date of Patent: Mar. 31, 1992

[54] EXTERNAL PIPE PROTECTOR

[76] Inventor: Bernard Ratzlaff, 5385 Olund Road., R.R. #2, Mt. Lehman, B.C., Canada, V0X1V0

[21] Appl. No.: 590,962

[22] Filed: Oct. 1, 1990

[51] Int. Cl.$^5$ .............................................. F16L 57/00
[52] U.S. Cl. ........................................ 138/110; 138/105; 138/128; 138/167; 428/99; 405/157
[58] Field of Search ............... 138/105, 128, 151, 110, 138/149, 170, 156, 167, DIG. 1; 428/99; 405/154, 157

[56] References Cited

U.S. PATENT DOCUMENTS

| | | | |
|---|---|---|---|
| 3,929,167 | 12/1975 | Bickel | 138/151 |
| 4,022,248 | 5/1977 | Hepner et al. | 138/151 |
| 4,351,683 | 9/1982 | Kusilek | 264/178 F |
| 4,359,502 | 11/1982 | Caponigro et al. | 138/128 |
| 4,413,656 | 11/1983 | Pithouse | 138/110 |
| 4,778,700 | 10/1988 | Pereira | 138/DIG. 1 |
| 4,780,347 | 10/1988 | Cohen | 138/DIG. 1 |
| 4,802,509 | 2/1989 | Brandolf | 138/DIG. 1 |
| 4,857,371 | 8/1989 | McClintock | 138/128 |
| 4,899,414 | 2/1990 | Irwin | 138/110 |
| 4,930,543 | 6/1990 | Zuiches | 138/110 |
| 4,985,942 | 1/1991 | Shaw | 138/110 |

Primary Examiner—James E. Bryant, III
Attorney, Agent, or Firm—Polster, Lieder, Woodruff & Lucchesi

[57] ABSTRACT

An external pipe protector for protecting steel or plastic pipe against damage is disclosed. The protector includes a flexible sheet of shock absorbing material which is shaped and sized to encircle at least part of the length of the pipe. Opposite ends of the shock absorbing material are positioned and secured in overlapping relationship to one another by fastening elements provided on the opposite overlapping ends of the shock absorbing material. The fastening elements are confronting adhesive surface attached to the opposite overlapping ends of the shock absorbing material. Strippable covers are initially attached to the adhesive surface prior to use thereof, and are easily removed to enable the adhesive surfaces to be brought into confronting relationship to one another. The shock absorbing material is preferably a flexible porous filamentary mat of open weave construction, enabling moisture to be dissipated from pipe encircled by the external pipe protector, and further enabling a charged electrical rod to penetrate the open weave construction for crack and rust deposit cathotic testing of steel pipe.

6 Claims, 2 Drawing Sheets

EXTERNAL PIPE PROTECTOR

BACKGROUND OF THE INVENTION

This invention relates to an external pipe protector for protecting steel or plastic pipe being laid in a trench and during subsequent back-filling of the trench and covering of the pipe.

During the laying of steel or plastic pipe in trenches, care must be taken to avoid damaging the pipe, such as by corrosion, scratches, marring or impact. There are also certain ground conditions, i.e., rocky areas, where the steel or plastic pipe is subject to damage.

It is well known that steel pipe is subject to corrosion, and it is usually coated with a plastic material during its manufacture, as well as having individual welds coated in the field, so as to prevent corrosion and thereby protect the owners investment. While plastic pipes are not subject to corrosion, they are subject to scratches, marring or impact during the laying of the pipe in a trench, as well as during subsequent back-filling of the trench and covering of the pipe.

Various types of products have been developed to serve as a rock shield or protector of steel or plastic pipes during laying of the pipes and during subsequent back-filling of the trench and covering of the pipe Such products including sand, sand bags, foam plastic pads, and poured-in-place foam plastic products. While each of these products function to protect the pipe, they are difficult and expensive to apply, and further some of the products restrict cathotic testing of steel pipes to determine cracks and rust deposits. The cathotic testing requires the insertion of a charge rod into the ground for contact with the steel pipe. It will be appreciated that in the case of the various foam plastic products, perforations must be provided in such products to facilitate the insertion of the charged electrical rod for contact with the steel pipe.

From the discussion that is follow, it will be apparent that the external pipe protector of the present invention overcomes the deficiencies of the prior art while providing numerous additional advantages and benefits not heretofore contemplated or possible with prior art constructions

SUMMARY OF THE INVENTION

Among the several objects and advantages of the present invention include:

The provision of a new and improved external pipe protector which protects steel or plastic pipe during laying of pipe in a trench and during subsequent back-filling of the trench and covering of the pipe;

The provision of the aforementioned external pipe protection which includes a flexible sheet of shock absorbing material that is quickly and conveniently wrapped about and fastened in encircling relationship to the pipe to protect same;

The provision of the aforementioned external pipe protection wherein the flexible sheet of shock absorbing material is provided with confronting adhesive surfaces on opposite overlapping ends to facilitate the quick and easy attachment of the opposite overlapping ends of the shock absorbing material to one another for encircling at least part of the length of the pipe;

The provision of the aforementioned external pipe protector which further includes strippable covers initially secured to confronting adhesive surfaces to protect same during shipment and storage of the product, while also enabling quick removal from the confronting adhesive surfaces during use of the external pipe protector;

The provision of the aforementioned external pipe protector which is constructed as a flexible porous mat to enable moisture to be dissipated from around the pipe, and further permits cathodic testing of steel pipe for crack and rust deposits, by enabling a charged electrical rod to be inserted through the open weave construction of the flexible porous mat;

The provision of the aforementioned external pipe protector in which the flexible porous mat is formed from a plurality of elongated filaments of thermoplastic and resilient material which are arranged in an irregular pattern of an overlapped and interengaged filaments, and further enabling adhesive material to be readily secured thereto at the opposite overlapping ends thereof; and The provision of the aforementioned external pipe protector which is efficient and economical to manufacture, is capable of being wound into a roll for shipping purposes, can be manufactured and/or cut in any desired width or length for desired applications, does not deteriorate when in use, and is otherwise well adapted for the purposes intended.

Briefly stated, the external pipe protector of the present invention includes a flexible sheet of shock absorbing material which is shaped and sized to encircle at part of a length of a pipe. Opposite ends of the shock absorbing material are positioned in overlapping relationship when the pipe. For securing the shock absorbing material in encircling relationship about the pipe, fastening means are provided on opposite overlapping ends of the shock absorbing material.

The fastening means preferably comprises confronting adhesive surfaces on the opposite overlapping ends of the shock absorbing material. The confronting adhesive surfaces are also each initially covered by a strippable cover which is removed when it is desired to fasten the opposite overlapping of the shock absorbing material to each other.

Preferably, the flexible sheet of shock absorbing material is a porous filamentary mat including a plurality of elongated filaments of thermoplastic and resilient material which are arranged in an irregular pattern of overlapped and interengaged filaments. The overlapped and interengaged resilient thermoplastic filaments of the porous filamentary mat also preferably have a sufficient height and rigidity to protect against damage to pipes.

In a porous filamentary mat construction, the confronting adhesive surfaces may comprise a pressure-sensitive, hot melt adhesive that is deposited in and among the filaments of the porous filamentary mat and which also extend outwardly beyond the filaments to provide the confronting adhesive surfaces.

The external pipe protector may be made in any width or length as desired so as to comprise a single element encircling the length pipe, or may comprise a series of juxtaposed shock absorbing material elements mounted in encircling relationship along one or more lengths of pipe.

These and other objects and advantages of the present invention will become apparent from the ensuing discussion.

BRIEF DESCRIPTION OF THE DRAWINGS

In the drawings.

Corresponding reference numerals will be used throughout the various figures of the drawings.

DESCRIPTION OF THE PREFERRED EMBODIMENT

The following detailed description illustrates the invention by way of example and not by way of limitation. This description will clearly enable one skilled in the art to make and use the invention, and describes several embodiments, adaptions, variations, alternatives and uses of the invention, including what I presently believe is the best mode of carrying out the invention.

The external pipe protector of the present invention is constructed for use in the pipe line construction industry as a protection for metal or plastic pipes during the laying of the pipe in a trench, and during subsequent back-filling of the trench and covering of the pipe. The external pipe protector is particularly useful in rocky areas where a plastic coating on a steel pipe or the plastic pipe itself can be subject to scratching, marring or other damage. It will be appreciated that the external pipe protector of the present invention can be used an a variety of different environments and soil conditions, wherever it is desired to protect the pipe against corrosion, scratching, marring, impact or other damage to steel or plastic pipes.

Figure 6:
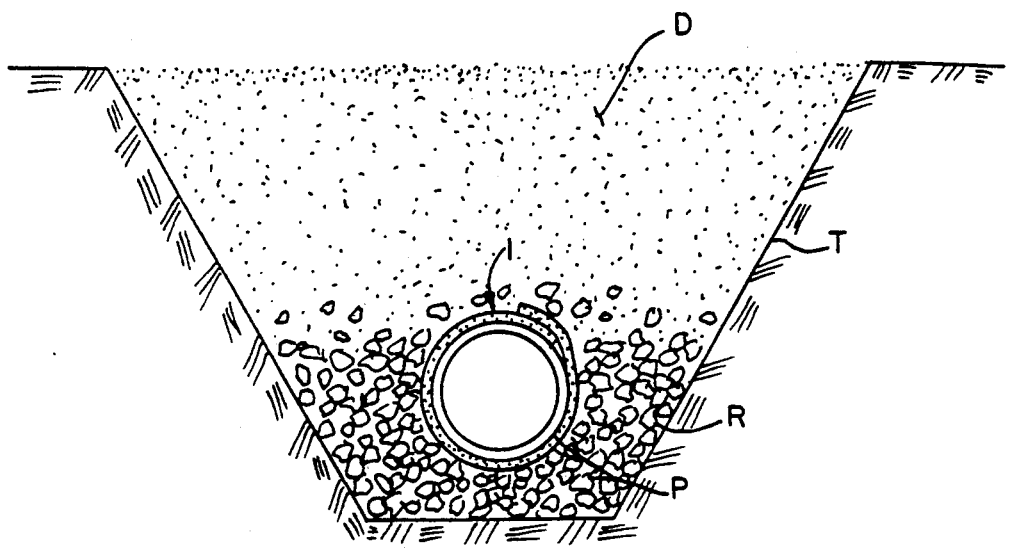
FIG. 6 is a side elevational view of a trench containing a pipe and an external pipe protector encircled thereabout, the trench having been back-filled and showing a rocky soil condition in the vicinity of the pipe and the external pipe protector.

As shown in FIG. 6 of the drawings, a length or more of pipe P is protected by the external pipe protector 1, which encircles the pipe and protects the pipe P against rocky areas R in the bottom of a trench T which has been back-filled with dirt D. The external pipe protector 1 may be applied to the pipe P either prior to being lowered into the trench T or after the pipe P is already located at the bottom of the trench T.

Referring now to the specific construction of the external pipe protector 1 as best shown in FIGS. 1-5 of the drawings, it will be seen that the external pipe protector 1 includes a flexible sheet of shock absorbing material 3 which preferably has a porous or open weave construction. As illustrated in the drawings, the flexible sheet of shock absorbing material 3 comprises a porous filamentary mat which includes a plurality of elongated filaments of thermoplastic and resilient material, i.e., polyvinyl chloride, which are arranged in an irregular pattern of overlapped and interengaged filaments, as shown. This provides a flexible mat or sheet 3 which is capable of being wrapped around at least part of the length of pipe P, as will be subsequently discussed, while also having sufficient height and rigidity, as illustrated, to provide a shock absorbing material.

While there are various constructions and methods of making various types of porous filamentary mats, reference is made to U.S. Pat. No. 4,351,683 which discloses one type of procedure for making open porous integrated filamentary mats, and U.S. patent application Ser. No. 393,085 filed Aug. 9, 1989, now U.S. Pat. No. 5,055,151, which discloses a second method for making porous filamentary mats. Thus, while the particular type of porous filamentary mat used and its method of manufacture forms no part per se of the present invention, reference is made to the above patents to illustrate several different types and constructions of porous filamentary mats which can be used as the flexible sheet or mat of shock absorbing material 3, in the external pipe protector 1 of the present invention.

Figure 1:
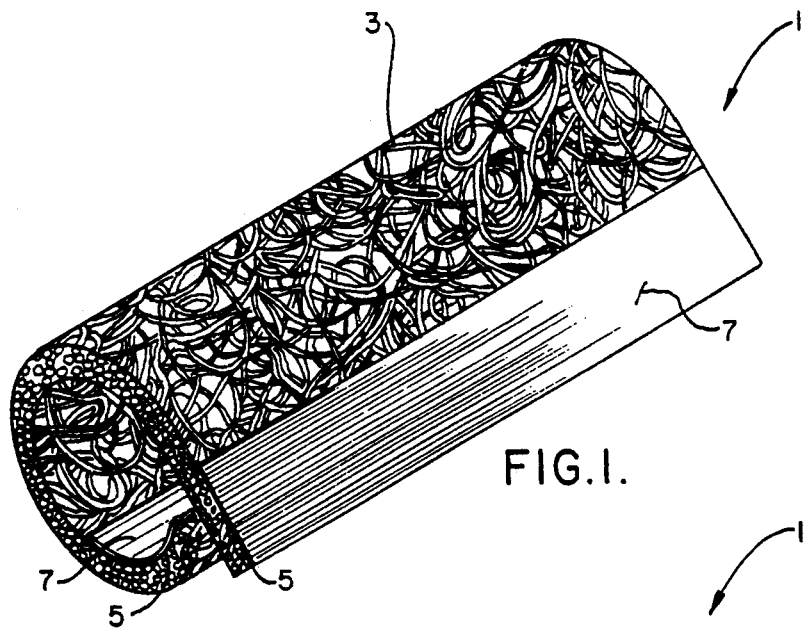
FIG. 1 is a perspective view of an external pipe protector construction in accordance with the teachings of the present invention, which is shown as being wound in a roll for storage and shipping purposes.
Figure 2:
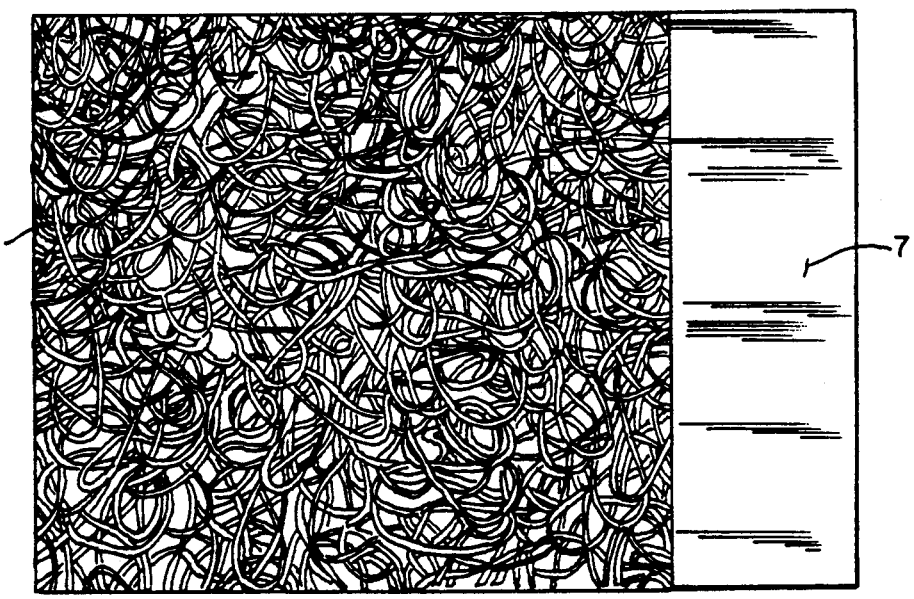
FIG. 2 is a top plan view of the external pipe protector illustrating its preferred form of construction.
Figure 3:
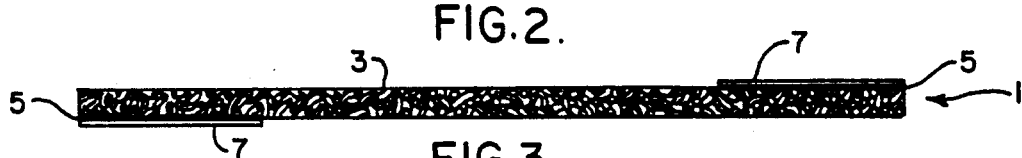
FIG. 3 is a side elevational view of the external pipe protector as shown in FIG. 2.
Figure 4:
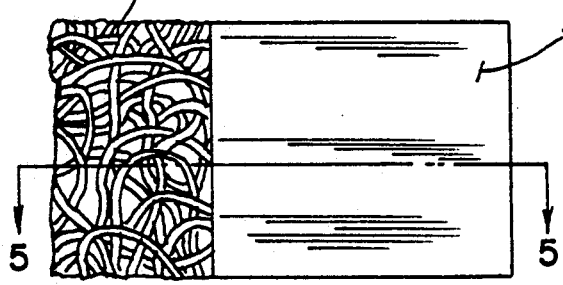
FIG. 4 is an enlarged fragmentary view of a part of the external pipe protector as shown in FIG. 2 of the drawings.
Figure 5:
FIG. 5 is an enlarged fragmentary sectional view of the external pipe protector as shown along lines 5—5 of FIG. 4.

As shown in FIG. 1 of the drawings, the external pipe protector 1 is illustrated as being sufficiently flexible to be wound about itself to enable a running length of material to be wound in a role for storage and shipment purposes. At the job construction site, the formed roll can be unwound and the external pipe protector could cut into the desired lengths for use on one or more lengths of pipe. Alternatively, the external pipe protector could be manufactured in the shape and size desired and then simply applied in the field, in the manner described below. It will also be appreciated that the external pipe protector 1 may be sized and shaped to encircle a substantial portion of one or more lengths of pipe or may be juxtaposed adjacent similarly formed external pipe protectors encircling one or more lengths of pipe, as desired.

Figure 7:
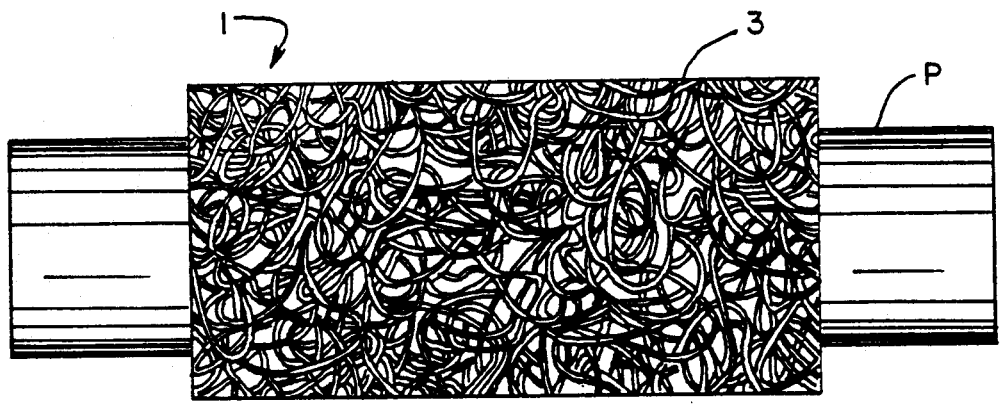
FIG. 7 is a side elevational view of at least one length of pipe and the external pipe protector encircling a substantial portion of the length of pipe.
Figure 8:
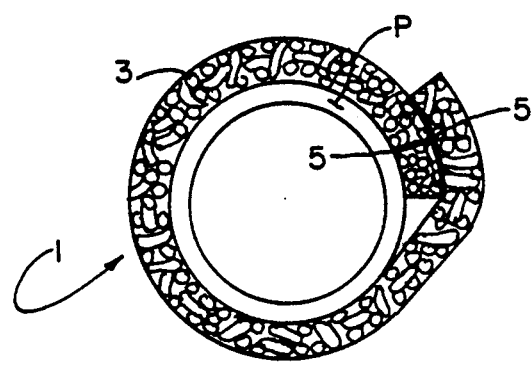
FIG. 8 is an end elevational view of the pipe and external pipe protector shown in FIG. 7 of the drawing.

Opposite ends of the flexible sheet of shock absorbing material 3 are capable of being positioned in overlapping relationship, when encircling the pipe P, as illustrated in FIGS. 6-8 of the drawings. For securing the flexible sheet of shock absorbing material 3 in encircling relationship about the pipe P, suitable fastening means are provided on the opposite overlapping ends of the shock absorbing material 3. As illustrated best in FIGS. 3, 5 and 8 of the drawings, the suitable fastening means comprises confronting adhesive surfaces 5, 5 which are attached or affixed to the opposite overlapping ends of the shock absorbing material 3. The adhesive surfaces or elements 5, 5 each comprise a pressure-sensitive, hot melt adhesive that is deposited in and among the filaments of the porous filamentary mat, for securing same to the flexible sheet or mat 3, while also extending outwardly beyond the filaments of the flexible sheet or mat 3, in order to provide the confronting adhesive surfaces 5, 5 for adhesive interengagement with one another. This is illustrated in FIG. 8 of the drawings, where the external pipe protector is encircled about the pipe P with the confronting adhesive surfaces 5, 5 adhesively securing the opposite overlapping ends of the flexible sheet or mat 3 relative to one another. The preferred type of pressure-sensitive hot melt adhesive is a butyl based adhesive that withstands cold temperature, has water repellent properties to enable the adhesive to work under extremely wet conditions, withstands ultraviolet rays, and is otherwise compatible with the thermoplastic and resilient material, i.e., polyvinyl chloride, from which the filaments of the flexible sheet or mat 3 are formed.

Prior to encircling the external pipe protector 1 about the pipe P as shown in FIGS. 7–8 of the drawings, the adhesive surfaces 5, 5 must be protected during storage and shipment of the external pipe protector product or roll. For this purpose, each adhesive surface 5, 5 is initially overlayed by a strippable cover 7, such as a film of thermoplastic material or the like, which is removed when it is desired to fasten the opposite overlapping ends of the flexible sheet or mat 3 to each other, as best shown in FIG. 8 of the drawings. As illustrated in FIGS. 1–5 of the drawings, each of the strippable covers 7, 7, which cover the adhesive surfaces 5, 5 of the flexible sheet or mat 3, correspond in size and shape to the adhesive surfaces 5, 5. It will be appreciated that the length and width of the adhesive surfaces 5, 5 and the strippable covers 7, 7 may be varied to suit the particulars desired. It is further possible that the adhesive surfaces 5, 5 may, instead of comprising a continuous adhesive surface, include interrupted designs or patterns, as may be desired. In that case, the strippable covers 7, 7 will correspond to the adhesive surfaces 5, 5 in whatever width, length, shape or configuration is desired.

From the foregoing, it will be appreciated that the flexible sheet or mat 3 of the external pipe protector 1 may be efficiently and economically formed as a single element or wrapped in a roll as desired. In the field, the flexible sheet or mat 3 of the external pipe protector 1 is capable of being quickly and conveniently encircled about a pipe P with the confronting adhesive surfaces 5, 5 on the opposite overlapping ends thereof being secured into adhesive interengagement, as shown in FIG. 8 of the drawings, once the strippable covers 7, 7 have been removed from the adhesive surfaces 5, 5. The pipe P, the external pipe protector 1 protects the pipe against the various types of pipe damage including corrosion, scratching, marring, impact, etc. Additionally, the porous or open mesh construction of the flexible sheet or mat 3 allows moisture to dissipate from around the pipe P, and further enables a charged rod to be brought into contact with the pipe, by insertion into the porous or open areas of the flexible sheet or mat 3, for performing the crack or rust cathotic testing in the field.

As a rock shield other environmental protector, it will now be apparent that the external pipe protector of the present invention provides numerous features and benefits heretofore unattainable.

In view of the above, it will be seen that the several objects and features of this invention are achieved and other advantageous results obtained.

As various changes could be made in the above constructions without departing from the scope of the invention, it is intended that all matter contained in the above description or shown in the accompanying drawings shall be interpreted as illustrative and not in a limiting sense.

I claim:

1. In the combination of a pipe and an external pipe protector, a means for protecting the pipe from scratches, marring and impact during the laying of the pipe in a trench, as well as during subsequent back-filling of the trench, and enabling moisture to be dissipated from around the pipe and further permitting cathodic testing therethrough, said means for protecting and permitting testing is constituted by said external pipe protector, said external pipe protector comprising a flexible sheet of shock absorbing material shaped and sized to encircle a length of pipe, said flexible sheet of shock absorbing material being constructed as a porous filamentary mat including a plurality of elongated filaments of thermoplastic and resilient material arranged in an irregular pattern of overlapped and interengaged filaments, opposite ends of said shock absorbing material being positioned in overlapping relationship when encircling said pipe, and fastening means attached to each of the opposite overlapping ends of said porous filamentary mat and being interconnected together for securing said porous filamentary mat in encircling relationship about said pipe.

2. The external pipe protector as defined in claim 1 wherein said fastening means comprise confronting adhesive surfaces structurally secured to the elongated filaments at the opposite overlapping ends of said porous filamentary mat.

3. The external pipe protector as defined in claim 2 wherein said confronting adhesive surfaces are each initially covered by a strippable cover which is removed when it is desired to fasten the opposite overlapping ends of said porous filamentary mat to each other.

4. The external pipe protector as defined in claim 1 wherein the overlapped and interengaged resilient thermoplastic filaments of the porous filamentary mat also have sufficient height and rigidity to protect the pipe against damage.

5. The external pipe protector as defined in claim 4 wherein the confronting adhesive surfaces on the opposite overlapping ends of said shock absorbing material each comprise a pressure-sensitive, hot melt adhesive deposited in and among the filaments of the porous filamentary mat and also extending outwardly beyond said filaments to provide said confronting adhesive surfaces.

6. In the combination of a pipe and an external pipe protector, a means for protecting the pipe from scratches, marring and impact during the laying of the pipe in a trench, as well as during subsequent back-filling of the trench, and enabling moisture to be dissipated from around the pipe and further permitting cathodic testing therethrough, said means for protecting and permitting testing is constituted by said external pipe protector, said external pipe protector comprising a flexible porous filamentary mat including a plurality of elongated filaments of thermoplastic and resilient shock absorbing material arranged in an irregular pattern of overlapped and interengaged filaments, said flexible porous filamentary mat being shaped and sized to encircle at least part of a length of pipe, opposite ends of said flexible porous filamentary mat being positioned in overlapping relationship when encircling said pipe, a pressure-sensitive hot melt adhesive deposited in and among the filaments of the porous filamentary mat and also extending outwardly beyond said filaments on the opposite overlapping ends of said flexible porous filamentary mat to form confronting adhesive surfaces, and a strippable cover initially secured to each of the confronting adhesive surfaces which is capable of being removed when it is desired to fasten the opposite overlapping ends of said shock absorbing material to each other.

* * * * *